(12) United States Patent
Tang et al.

(10) Patent No.: US 8,552,677 B2
(45) Date of Patent: Oct. 8, 2013

(54) FAN ROTARY SPEED CONTROLLING DEVICE

(75) Inventors: Chung-Hung Tang, Taoyuan Hsien (TW); Chien-Sheng Lin, Taoyuan Hsien (TW); Chin-Fa Chiu, Taoyuan Hsien (TW); Chun-Lung Chiu, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 218 days.

(21) Appl. No.: 13/033,894

(22) Filed: Feb. 24, 2011

(65) Prior Publication Data

US 2012/0112679 A1    May 10, 2012

(30) Foreign Application Priority Data

Nov. 8, 2010   (TW) ................................ 99138290 A

(51) Int. Cl.
*H02P 1/00*      (2006.01)
*H02P 3/00*      (2006.01)
(52) U.S. Cl.
USPC .. 318/494; 318/430; 318/400.11; 318/400.13
(58) Field of Classification Search
USPC ............... 318/494, 471, 400.26, 400.13, 268, 318/811, 254, 400.11, 430, 650; 327/1, 327/172; 363/131; 388/811; 165/121; 307/80; 324/161
See application file for complete search history.

(56) References Cited

U.S. PATENT DOCUMENTS

| | | | |
|---|---|---|---|
| 4,608,527 A * | 8/1986 | Glennon et al. ............... 318/685 |
| 5,406,071 A * | 4/1995 | Elms ........................ 250/214 A |
| 6,040,668 A * | 3/2000 | Huynh et al. .................. 318/471 |
| 6,104,151 A * | 8/2000 | Tsai ........................ 318/400.11 |
| RE37,589 E * | 3/2002 | Mueller ..................... 318/400.26 |
| 6,570,778 B2 * | 5/2003 | Lipo et al. ......................... 363/41 |
| 6,621,242 B2 * | 9/2003 | Huang et al. ................... 318/268 |
| 6,737,860 B2 * | 5/2004 | Hsu et al. ....................... 324/161 |
| 7,208,893 B2 * | 4/2007 | Furuki ...................... 318/400.01 |
| 7,230,409 B1 * | 6/2007 | Cox .............................. 323/284 |
| 7,646,115 B2 * | 1/2010 | Illegems ......................... 307/80 |
| 7,667,512 B2 * | 2/2010 | Alberkrack et al. ........... 327/172 |
| 7,915,843 B2 * | 3/2011 | Mishima et al. .......... 318/400.13 |
| 8,093,846 B2 * | 1/2012 | Mishima et al. .......... 318/400.13 |
| 8,093,848 B2 * | 1/2012 | Suzuki .......................... 318/432 |
| 8,198,852 B2 * | 6/2012 | Aono et al. .................... 318/650 |
| 2002/0159791 A1 * | 10/2002 | Chen et al. .................... 399/167 |
| 2003/0020460 A1 * | 1/2003 | Hsu et al. ....................... 324/161 |
| 2003/0038609 A1 * | 2/2003 | Shien ............................. 318/751 |
| 2003/0043606 A1 * | 3/2003 | Lipo et al. ........................ 363/41 |
| 2003/0062863 A1 * | 4/2003 | Huang et al. .................. 318/268 |
| 2004/0184206 A1 * | 9/2004 | Nomura et al. ................. 361/31 |
| 2006/0158140 A1 * | 7/2006 | Furuki ............................ 318/68 |

(Continued)

*Primary Examiner* — Paul Ip
(74) *Attorney, Agent, or Firm* — Muncy, Geissler, Olds & Lowe, PLLC

(57) ABSTRACT

A fan rotary speed controlling device includes a first signal generating circuit, a second signal generating circuit, a pulse width modulation (PWM) circuit and a switching circuit. The first signal generating circuit receives a real frequency signal and a target frequency signal, and generates a first signal according to the real frequency signal and the target frequency signal. The second signal generating circuit generates a second signal according to the first signal. The PWM circuit generates a PWM signal according to the second signal. The switching circuit is electrically connected with the PWM circuit and outputs a control signal to control the rotary speed of the motor. Hence, the fan rotary speed controlling device boosts the accuracy and the stability of the fan rotary speed.

19 Claims, 4 Drawing Sheets

(56) References Cited

U.S. PATENT DOCUMENTS

| | | | |
|---|---|---|---|
| 2007/0001643 A1* | 1/2007 | Buerk et al. | 318/811 |
| 2007/0025707 A1* | 2/2007 | Lin et al. | 388/811 |
| 2007/0120510 A1* | 5/2007 | Wang | 318/268 |
| 2007/0121356 A1* | 5/2007 | Lee | 363/131 |
| 2007/0138984 A1* | 6/2007 | Yang et al. | 318/254 |
| 2007/0139028 A1* | 6/2007 | Cox | 323/284 |
| 2008/0164765 A1* | 7/2008 | Illegems | 307/80 |
| 2008/0238487 A1* | 10/2008 | Alberkrack et al. | 327/1 |
| 2008/0240688 A1* | 10/2008 | Alberkrack et al. | 388/811 |
| 2008/0272724 A1* | 11/2008 | Hayashi | 318/430 |
| 2008/0297095 A1* | 12/2008 | Aono et al. | 318/650 |
| 2009/0153084 A1* | 6/2009 | Mishima et al. | 318/400.13 |
| 2009/0184672 A1* | 7/2009 | Suzuki | 318/400.13 |
| 2011/0139412 A1* | 6/2011 | Mishima et al. | 165/121 |

* cited by examiner

FAN ROTARY SPEED CONTROLLING DEVICE

CROSS REFERENCE TO RELATED APPLICATIONS

This Non-provisional application claims priority under 35 U.S.C. §119(a) on Patent Application No(s). 099138290 filed in Taiwan, Republic of China on Nov. 8, 2010, the entire contents of which are hereby incorporated by reference.

BACKGROUND OF THE INVENTION

1. Field of Invention

The present invention relates to a fan rotary speed controlling device and, in particular, to a fan rotary speed controlling device of a brushless DC fan.

2. Related Art

Regarding to the driving mechanism of the motor of a current brushless DC fan, a Hall sensor is involved to determine the positions of magnetic poles of the permanent magnetic rotor after the windings of the stator is powered on. Accordingly, the direction of the current flowing through the windings of the stator is changed to generate the alternative magnetic field, which can push the permanent magnetic rotor to continuously rotate. Currently, the PWM (pulse width modulation) technology is the most popular rotary speed control technology for the fan motor.

As shown in FIG. 1, a conventional fan rotary speed controlling device 1 is applied to control the rotary speed of a motor 7. The fan rotary speed controlling device 1 includes a rotary-speed voltage conversion circuit 11, a control circuit 12, a pulse width modulation (PWM) circuit 13, and a switching circuit 14. The rotary-speed voltage conversion circuit 11 receives a rotary-speed signal S1, which represents the rotary speed of the motor 7 while operating. Then, the rotary-speed voltage conversion circuit 11 converts the rotary-speed signal S1 into a voltage signal S2, which is then transmitted to the control circuit 12. The control circuit 12, which includes a PID (Proportion-Integral-Differential) controller, receives the voltage signal S2 and a target voltage signal S3, and compares the voltage signal S2 with the target voltage signal S3 to output a signal S4. The PWM circuit 13 generates a PWM signal S6 according to the signal S4 and a fundamental frequency signal S5. The switching circuit 14 turns on/off a plurality of switch elements depending on the PWM signal S6, so that it can output a control signal S7 to control the rotary speed of the motor 7.

The conventional constant-rotary-speed controlling method for motors, such as the above-mentioned PID control or programmable logic control (PLC), can achieve the desired constant-rotary-speed control for motors. However, these conventional methods can not precisely control the rotary speed of the motor, and have the problems of difficult adjustment and high cost.

SUMMARY OF THE INVENTION

In view of the foregoing subject, an objective of the present invention is to provide a fan rotary speed controlling device that can enhance the stability and preciseness of the rotary speed.

To achieve the above objective, the present invention discloses a fan rotary speed controlling device including a first signal generating circuit, a second signal generating circuit, a pulse width modulation (PWM) circuit and a switching circuit. The first signal generating circuit receives a real frequency signal and a target frequency signal, and generates a first signal according to the real frequency signal and the target frequency signal. The second signal generating circuit is electrically connected with the first signal generating circuit and generates a second signal according to the first signal. The PWM circuit is electrically connected with the second signal generating circuit and generates a PWM signal according to the second signal. The switching circuit is electrically connected with the PWM circuit and outputs a control signal to control the rotary speed of a motor.

In one embodiment of the present invention, the second signal generating circuit includes a filter for receiving the first signal and filtering the first signal to generate the second signal, which is a DC signal.

In one embodiment of the present invention, the switching circuit comprises a bridge circuit.

In one embodiment of the present invention, the fan rotary speed controlling device further includes an integrated circuit electrically connected with the first signal generating circuit and the switching circuit.

In one embodiment of the present invention, the integrated circuit includes a signal converter for receiving an external PWM signal and generating the target frequency signal according to the external PWM signal.

In one embodiment of the present invention, the integrated circuit includes an oscillator for outputting a square wave signal.

In one embodiment of the present invention, the fan rotary speed controlling device further includes a waveform converting circuit electrically connected with the integrated circuit and the PWM circuit. The waveform converting circuit receives the square wave signal and outputs a third signal to the PWM circuit according to the square wave signal.

As mentioned above, in the fan rotary speed controlling device of the present invention, the first signal generating circuit receives the real frequency signal of an operation motor and a target frequency signal, and generates the first signal according to the real frequency signal and the target frequency signal, the second signal generating circuit generates the second signal according to the first signal, the PWM circuit generates the PWM signal according to the second signal and the fundamental frequency signal, and the switching circuit controls the bridge circuit according to the PWM signal and outputs the control signal depending on ON/OFF states of the switch elements of the bridge circuit so as to control the rotary speed of the motor. Consequently, the fan rotary speed controlling device of the present invention can keep adjusting the rotary speed of the motor, thereby enhancing the preciseness and stability of the motor rotary speed.

BRIEF DESCRIPTION OF THE DRAWINGS

The present invention will become more fully understood from the subsequent detailed description and accompanying drawings, which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
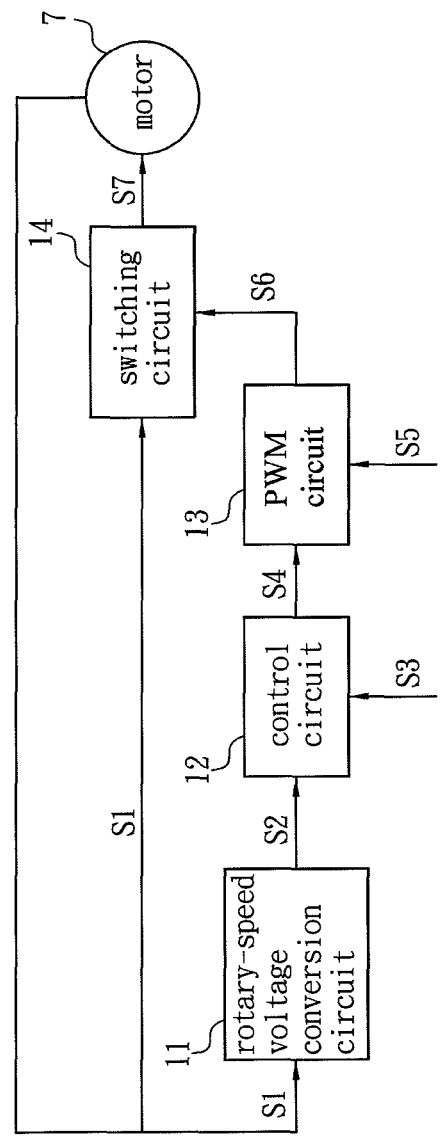
FIG. 1 is a schematic diagram of a conventional fan rotary speed controlling device.
Figure 2:
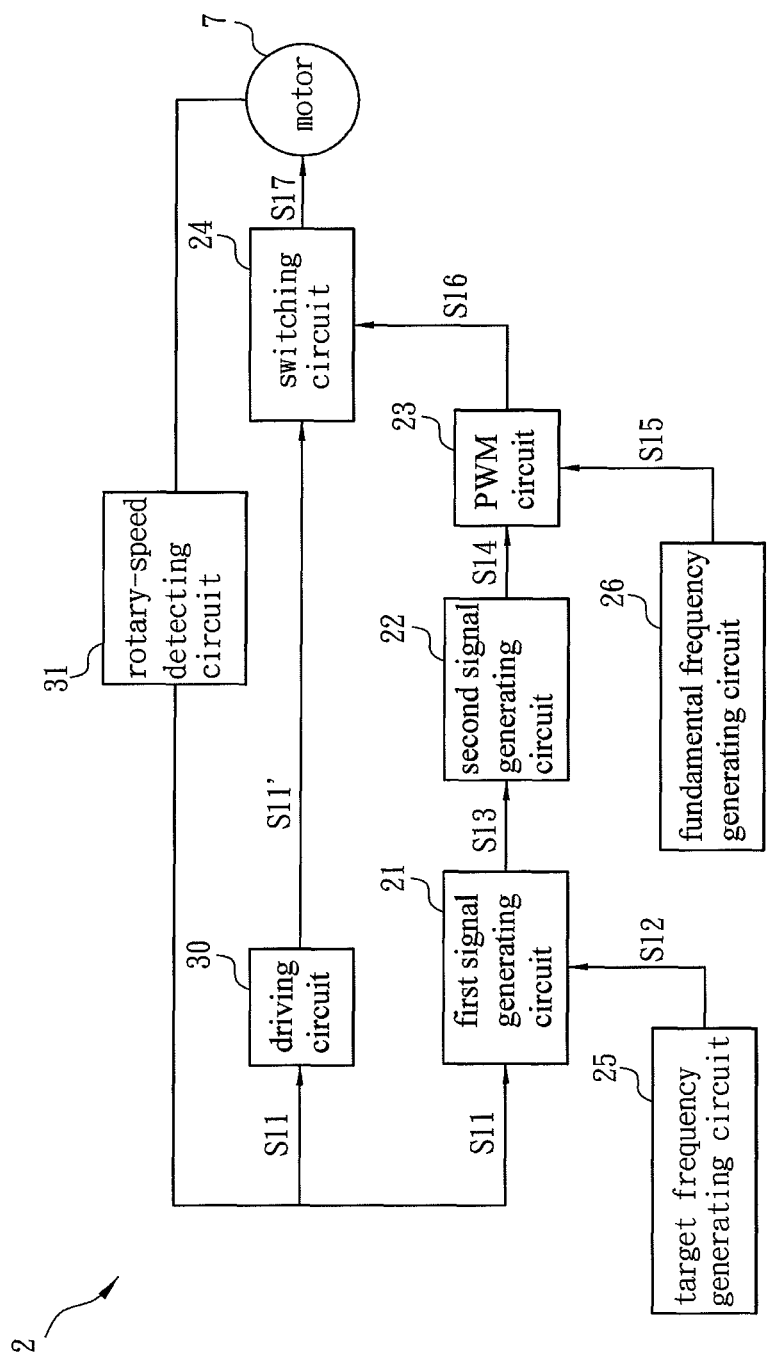
FIG. 2 is a schematic diagram of a fan rotary speed controlling device according to a first embodiment of the present invention.

With reference to FIG. 2, a fan rotary speed controlling device 2 according to a first embodiment of the invention is applied to control the rotary speed of a motor 7. In this embodiment, the fan rotary speed controlling device 2 is used in a brushless DC fan. The fan rotary speed controlling device 2 includes a first signal generating circuit 21, a second signal generating circuit 22, a pulse width modulation (PWM) circuit 23, and a switching circuit 24. In order to efficiently enhance the preciseness and stability of the rotary speed of the motor 7, the fan rotary speed controlling device 2 is designed based on the concept of phase locked loop (PLL).

In addition, the fan rotary speed controlling device 2 further includes a driving circuit 30 and a rotary-speed detecting circuit 31. The rotary-speed detecting circuit 31 includes a rotary-speed detecting element for detecting the rotary speed of the operating motor 7. The rotary-speed detecting circuit 31 can further convert the detected rotary speed into an operating frequency and thus generate a real frequency signal S11. Then, the real frequency signal S11 is transmitted to the first signal generating circuit 21 and the driving circuit 30. In this embodiment, the rotary-speed detecting element can be a Hall sensor or an opto-coupler.

The first signal generating circuit 21 receives the real frequency signal S11 and a target frequency signal S12. In this embodiment, the target frequency signal S12 is generated by a target frequency generating circuit 25 and output to the first signal generating circuit 21. The target frequency signal S12 represents the frequency corresponding to the desired rotary speed of the motor 7. Then, the first signal generating circuit 21 generates a first signal S13 according to the relative error between the real frequency signal S11 and the target frequency signal S12.

The second signal generating circuit 22 is electrically connected with the first signal generating circuit 21 and includes a filter. The filter receives the first signal S13 and filters it to generate a second signal S14, which is a direct current (DC) signal.

In addition, the fan rotary speed controlling device 2 further includes a fundamental frequency generating circuit 26, which generates a fundamental frequency signal S15. In this embodiment, the fundamental frequency signal S15 is a triangle wave.

The PWM circuit 23 is electrically connected with the second signal generating circuit 22 and the fundamental frequency generating circuit 26. In this embodiment, the PWM circuit 23 generates a PWM signal S16 according to the second signal S14 and the fundamental frequency signal S15, and then outputs the PWM signal S16 to the switching circuit 24.

The switching circuit 24 is electrically connected with the PWM circuit 23. The switching circuit 24 includes a bridge circuit such as a single-phase full-bridge circuit, single-phase half-bridge circuit or three-phase full-bridge circuit. In practice, the switching circuit 24 controls the ON/OFF states of the switch elements of the bridge circuit according to the PWM signal S16, and then outputs a control signal S17 depending on the ON/OFF states of the switch elements and the signal 11' converted from the real frequency signal 11 by the driving circuit 30 so as to control the rotary speed of the motor 7.

Regarding to a PLL, it is composed of a phase/frequency detector (PFD), a loop filter and a voltage control oscillator (VCO), all of which are connected with each other to form a closed loop. In this embodiment, the first signal generating circuit 21 is equivalent to a PFD, the second signal generating circuit 22 is equivalent to a loop filter, and the PWM circuit 23, the switching circuit 24 and the motor 7 are together to be equivalent to a VCO.

The first signal generating circuit 21 receives the target frequency signal S12 and takes the real frequency signal S11 outputted from the motor 7 as a feedback signal. Furthermore, the first signal generating circuit 21 can generate the first signal S13 according to the error between the target frequency signal S12 and the real frequency signal S11, and then outputs the first signal S13 to the second signal generating circuit 22. Then, the filter of the second signal generating circuit 22 filters the first signal S13 to generate the second signal S14, which is a DC signal, and the second signal generating circuit 22 outputs the second signal S14 to the PWM circuit 23. The PWM circuit 23 outputs the PWM signal S16 to the switching circuit 24 after comparing the second signal S14 with the fundamental frequency signal 15. Accordingly, the switching circuit 24 can control the rotary speed of the motor 7. By repeating the above procedures, the rotary speed of the motor 7 can be adjusted until that the real frequency signal S11 is equal to the target frequency signal S12. When the real frequency signal S11 is equal to the target frequency signal S12, the first signal S13 outputted by the first signal generating circuit 21 is fixed so that the rotary speed of the motor 7 can be kept constant.

The above description discloses the fundamental aspect of the fan rotary speed controlling device of the invention, and the further modified aspects thereof will be illustrated hereinafter with reference to the following two embodiments.

Figure 3:
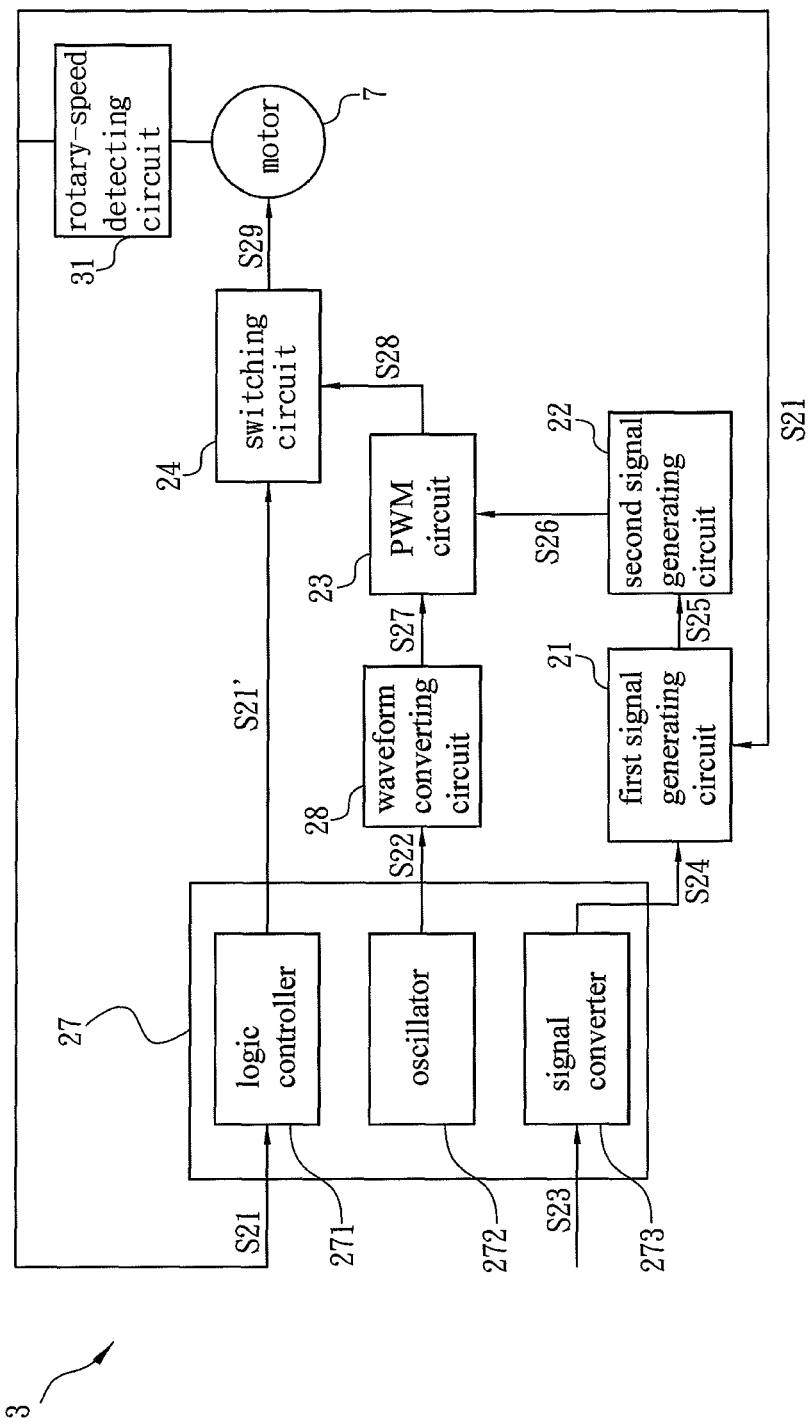
FIG. 3 is a schematic diagram of a fan rotary speed controlling device according to a second embodiment of the present invention.

Referring to FIG. 3, a fan rotary speed controlling device 3 according to a second embodiment of the invention includes a first signal generating circuit 21, a second signal generating circuit 22, a PWM circuit 23, a switching circuit 24 and a rotary-speed detecting circuit 31. Compared with the above-described first embodiment, the fan rotary speed controlling device 3 of this embodiment further includes an integrated circuit 27 and a waveform converting circuit 28. The integrated circuit 27 includes a logic controller 271 with programmable software, an oscillator 272, and a signal converter 273. The integrated circuit can be a microcontroller, a microprocessor, a programmable gate array (PGA), or an application-specific integrated circuit (ASIC) component.

The rotary-speed detecting circuit converts the rotary speed of the motor 7 into an operating frequency and thus generates a real frequency signal S21. Then, the real frequency signal S21 is transmitted to the first signal generating circuit 21 and the logic controller 271.

The logic controller 271 is electrically connected with the switching circuit 24 and converts the real frequency signal S21 to a signal S21' to be transmitted to the switching circuit 24. The oscillator 272 outputs a square wave signal S22 to the waveform converting circuit 28. The signal converter 273 receives an external PWM signal S23 and converts the external PWM signal S23 into a target frequency signal S24 according to the duty cycle of the external PWM signal S23.

The first signal generating circuit 21 receives the real frequency signal S21 and the target frequency signal S24, and then generates a first signal S25 according to the real frequency signal S21 and the target frequency signal S24.

The second signal generating circuit 22 is electrically connected with the first signal generating circuit 21 and includes a filter. The filter receives the first signal S25 and filters it to generate a second signal S26, which is a DC signal.

The waveform converting circuit 28 electrically connected with the oscillator 272 receives the square wave signal S22 and converts it into a signal S27 which is a triangle wave signal.

The PWM circuit 23 is electrically connected with the second signal generating circuit 22 and the waveform converting circuit 28. In this embodiment, the PWM circuit 23 generates a PWM signal S28 according to the second signal S26 and the signal S27, and then outputs the PWM signal S28 to the switching circuit 24.

The switching circuit 24 is electrically connected with the PWM circuit 23, and it includes a bridge circuit such as a single-phase full-bridge circuit, single-phase half-bridge circuit or three-phase full-bridge circuit. In this embodiment, the switching circuit 24 controls the ON/OFF states of the switch elements of the bridge circuit according to the PWM signal S28, and then outputs a control signal S29 depending on the ON/OFF states of the switch elements and the signal S21' so as to control the rotary speed of the motor 7.

Figure 4:
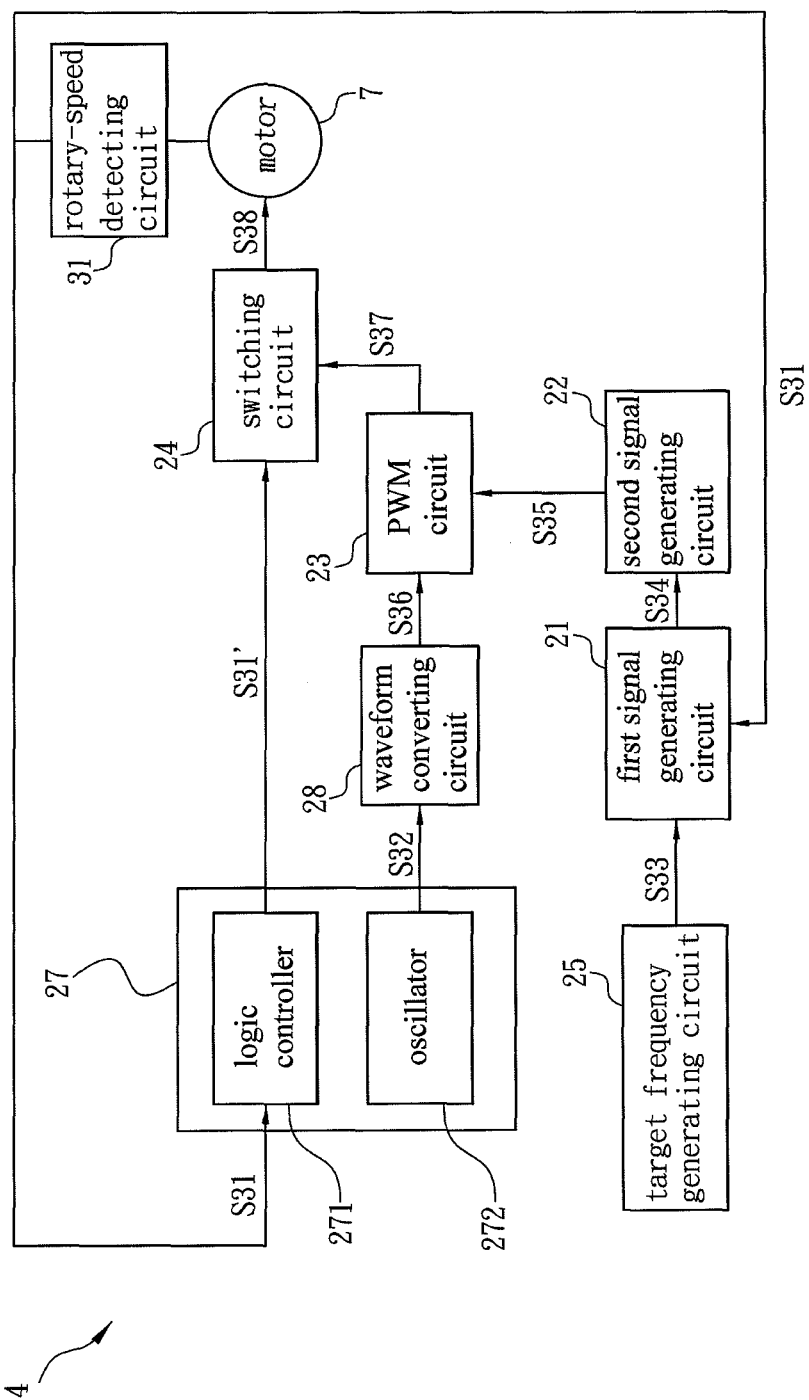
FIG. 4 is a schematic diagram of a fan rotary speed controlling device according to a third embodiment of the present invention.

Referring to FIG. 4, a fan rotary speed controlling device 4 according to a third embodiment of the invention includes a first signal generating circuit 21, a second signal generating circuit 22, a PWM circuit 23, a switching circuit 24, a target frequency generating circuit 25, and a rotary-speed detecting circuit 31. Compared with the above-described first embodiment, the fan rotary speed controlling device 4 of this embodiment further includes an integrated circuit 27 and a waveform converting circuit 28. The integrated circuit 27 includes a logic controller 271 with programmable software and an oscillator 272.

The rotary-speed detecting circuit 31 converts the rotary speed of the motor 7 into an operating frequency and thus generates a real frequency signal S31. Then, the real frequency signal S31 is transmitted to the first signal generating circuit 21 and the logic controller 271.

The logic controller 271 is electrically connected with the switching circuit 24 and converts the real frequency signal S31 to a signal 31' to be transmitted to the switching circuit 24. The oscillator 272 outputs a square wave signal S32 to the waveform converting circuit 28.

The target frequency generating circuit 25 generates a target frequency signal S33, which indicates the desired rotary speed of the motor 7, and then outputs the target frequency signal S33 to the first signal generating circuit 21.

The first signal generating circuit 21 receives the real frequency signal S31 and the target frequency signal S33, and then generates a first signal S34 according to the real frequency signal S31 and the target frequency signal S33.

The second signal generating circuit 22 is electrically connected with the first signal generating circuit 21 and includes a filter. The filter receives the first signal S34 and filters it to generate a second signal S35 which is a DC signal.

The waveform converting circuit 28 electrically connected with the oscillator 272 receives the square wave signal S32 and converts it into a signal S36 which is a triangle wave signal.

The PWM circuit 23 is electrically connected with the second signal generating circuit 22 and the waveform converting circuit 28. In this embodiment, the PWM circuit 23 generates a PWM signal S37 according to the second signal S35 and the signal S36, and then outputs the PWM signal S37 to the switching circuit 24.

The switching circuit 24 is electrically connected with the PWM circuit 23, and includes a bridge circuit such as a single-phase full-bridge circuit, single-phase half-bridge circuit or three-phase full-bridge circuit. In this embodiment, the switching circuit 24 controls the ON/OFF states of the switch elements of the bridge circuit according to the PWM signal S37, and then outputs a control signal S38 depending on the ON/OFF states of the switch elements and the signal S31' converted from the real frequency signal S31 by the logic controller 271 so as to control the rotary speed of the motor 7.

To sum up, in the fan rotary speed controlling device of the present invention, the first signal generating circuit receives the real frequency signal of an operation motor and a target frequency signal, and generates the first signal according to the real frequency signal and the target frequency signal, the second signal generating circuit generates the second signal according to the first signal, the PWM circuit generates the PWM signal according to the second signal and the fundamental frequency signal, and the switching circuit controls the bridge circuit according to the PWM signal and outputs the control signal depending on ON/OFF states of the switch elements of the bridge circuit so as to control the rotary speed of the motor. Consequently, the fan rotary speed controlling device of the present invention can keep adjusting the rotary speed of the motor, thereby enhancing the preciseness and stability of the motor rotary speed.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A fan rotary speed controlling device for controlling a rotary speed of a motor, comprising:
   a first signal generating circuit receiving a real frequency signal and a target frequency signal, and generating a first signal according to the real frequency signal and the target frequency signal;
   a second signal generating circuit electrically connected with the first signal generating circuit and generating a second signal according to the first signal;
   a pulse width modulation (PWM) circuit electrically connected with the second signal generating circuit and generating a PWM signal according to the second signal;
   a switching circuit electrically connected with the PWM circuit and outputting a control signal to control the rotary speed of the motor; and
   a driving circuit electrically connected to the switching circuit and the first signal generating circuit,
   wherein the driving circuit receives the real frequency signal and outputs a signal converted from the real frequency signal to the switching circuit.

2. The fan rotary speed controlling device according to claim 1, wherein the second signal generating circuit comprises a filter for receiving the first signal and filtering the first signal to generate the second signal.

3. The fan rotary speed controlling device according to claim 1, wherein the switching circuit comprises a bridge circuit.

4. The fan rotary speed controlling device according to claim 3, wherein the bridge circuit is a single-phase full-bridge circuit, single-phase half-bridge circuit or three-phase full-bridge circuit.

5. The fan rotary speed controlling device according to claim 1, further comprising an integrated circuit electrically connected with the first signal generating circuit and the switching circuit.

6. The fan rotary speed controlling device according to claim 5, wherein the integrated circuit is a microcontroller, a microprocessor, a programmable gate array (PGA), or an application-specific integrated circuit (ASIC) component.

7. The fan rotary speed controlling device according to claim 5, wherein the integrated circuit comprises a logic controller with programmable software.

8. The fan rotary speed controlling device according to claim 7, wherein the integrated circuit comprises a signal converter for receiving an external PWM signal and generating the target frequency signal according to the external PWM signal.

9. The fan rotary speed controlling device according to claim 7, wherein the integrated circuit comprises an oscillator for outputting a square wave signal.

10. The fan rotary speed controlling device according to claim 9, further comprising a waveform converting circuit electrically connected with the integrated circuit and the PWM circuit, wherein the waveform converting circuit receives the square wave signal and converts the square ware signal to a triangular wave signal so as to be output to the PWM circuit according to the square wave signal.

11. The fan rotary speed controlling device according to claim 1, further comprising a rotary-speed detecting circuit for detecting the rotary speed of the operating motor and converting the detected rotary speed into an operating frequency to generate the real frequency signal to be transmitted to the first signal generating circuit.

12. The fan rotary speed controlling device according to claim 11, wherein the rotary-speed detecting element is a Hall sensor or an opto-coupler.

13. The fan rotary speed controlling device according to claim 1, further comprising a target frequency generating circuit for generating the target frequency signal to be output to the first signal generating circuit.

14. The fan rotary speed controlling device according to claim 1, further comprising a fundamental frequency generating circuit for generating a fundamental frequency signal, wherein the PWM circuit generates the PWM signal according to the second signal and the fundamental frequency signal, and outputs the PWM signal to the switching circuit.

15. The fan rotary speed controlling device according to claim 14, wherein the fundamental frequency signal is a triangle wave.

16. The fan rotary speed controlling device according to claim 1, wherein the first signal generating circuit is equivalent to a phase/frequency detector (PFD), the second signal generating circuit is equivalent to a loop filter, and the PWM circuit, the switching circuit and the motor are equivalent to a voltage control oscillator (VCO).

17. The fan rotary speed controlling device according to claim 1, wherein the second signal is a direct current (DC) signal.

18. A fan rotary speed controlling device for controlling a rotary speed of a motor, comprising:
a first signal generating circuit receiving a real frequency signal and a target frequency signal, and generating a first signal according to the real frequency signal and the target frequency signal;
a second signal generating circuit electrically connected with the first signal generating circuit and generating a second signal according to the first signal;
a pulse width modulation (PWM) circuit electrically connected with the second signal generating circuit and generating a PWM signal according to the second signal;
a switching circuit electrically connected with the PWM circuit and, outputting a control signal to control the rotary speed of the motor; and
a fundamental frequency generating circuit for generating a fundamental frequency signal, wherein the PWM circuit generates the PWM signal according to the second signal and the fundamental frequency signal, and outputs the PWM signal to the switching circuit.

19. A fan rotary speed controlling device for controlling a rotary speed of a motor, comprising:
a first signal generating circuit receiving a real frequency signal and a target frequency signal, and generating a first signal according to the real frequency signal and the target frequency signal;
a second signal generating circuit electrically connected with the first signal generating circuit and generating a second signal according to the first signal;
a pulse width modulation (PWM) circuit electrically connected with the second signal generating circuit and generating a PWM signal according to the second signal;
a switching circuit electrically connected with the PWM circuit and outputting a control signal to control the rotary speed of the motor;
an integrated circuit electrically connected with the first signal generating circuit and the switching circuit wherein the integrated circuit comprises an oscillator for outputting a square wave signal; and
a waveform converting circuit electrically connected with the integrated circuit and the PWM circuit, wherein the waveform converting circuit receives the square wave signal and converts the square ware signal to a triangular wave signal so as to be output to the PWM circuit according to the square wave signal.

* * * * *